3,631,132
FLAME RESISTANT EXPANDABLE STYRENE POLYMERS CONTAINING TRIBROMOPHENYL-DIBROMOPROPYL ETHER AND METHOD OF PREPARING

Helmut Westernacher, Hans-Wolfgang Jurgeleit, and Anton Schick, Marl, Germany, assignors to Chemische Werke Huls Aktiengesellschaft, Marl, Germany
No Drawing. Filed Aug. 12, 1970, Ser. No. 63,329
Claims priority, application Germany, Sept. 13, 1969,
P 19 46 441.6
Int. Cl. C08j 1/26
U.S. Cl. 260—2.5 FP                16 Claims

ABSTRACT OF THE DISCLOSURE

Flame resistant expandable styrene polymers prepared by treating the styrene polymers in an aqueous suspension at temperatures of between about 80 and 150° C. with tribromophenyldibromopropyl ether in the liquid phase.

CROSS-REFERENCE TO A RELATED APPLICATION

Applicants claim priority under 35 U.S.C. 119 for Application P 19 46 441.6, filed Sept. 13, 1969 in the Patent Office of the Federal Republic of Germany.

BACKGROUND OF THE INVENTION

The field of the invention is pore-forming synthetic resins prepared in a dispersing medium with halogenated hydrocarbons. The invention is particularly concerned with flame resistant expandable styrene polymers containing tribromophenyl-dibromopropyl ether.

The state of the prior art may be ascertained by reference to U.S. Pat. 2,983,692 of D'Alelio, which issued May 9, 1961, 3,009,888 of Mueller-Tamm which issued Nov. 21, 1961, and 3,324,076 of Elder et al. which issued June 6, 1967, the disclosures of which are incorporated herein. The D'Alelio patent discloses the state of the art of incorporating blowing agents into styrene polymers during the suspension polymerization. Mueller-Tamm discloses difficultly inflammable expandable polystyrene containing a volatile non-solvent for polystyrene having a boiling point between 20 and 60° C. and containing from 0.5 to 6.0 percent by weight of a 2,3-dibromopropanol-1 compound which is prepared in an aqueous suspension. Elder et al. discloses a flame retardant thermoplastic molding resin of an alkenyl aromatic polymer containing a minor amount of halogenated compound and a synergist for the halogenated compound.

The preparation of the raw material tribromophenyl-dibromopropyl ether having a melting point of about 40–42° C. is disclosed in L. C. Felton et al., Org. Chemistry 12 (1947), p. 298.

It is conventional to impart flame resistance to styrene polymers with the aid of halogens or halogen compounds. In particular, bromine or bromine compounds are employed in this connection, due to their superior effectiveness. Thus, in general, 2–4 percent by weight of bromine in the styrene polymer is sufficient, whereas in contrast thereto, 20–30 percent by weight of chlorine is required.

According to the disclosure of German Pat. 1,002,125 of Stastny, filed June 20, 1954, bromine compounds can be added to the monomeric styrene during the polymerization.

However, such processes exhibit the disadvantage that the products obtained, in many cases do not possess sufficient stability due to the regulating effect of the bromine compounds.

In order to avoid this disadvantage, according to further conventional processes, the bromine compounds are added to the granular or bead-like polystyrene as disclosed in U.S. Pat. 3,324,076 of Elder et al., which issued June 6, 1967. For the purpose of effecting a more satisfactory and uniform distribution of the bromine compounds, additional solvents or/and dispersing agents were employed in this connection as disclosed in German Pats. 1,067,586 of Stastny et al. filed Dec. 28, 1957; 1,090,851 of Mueller-Tamm filed May 20, 1958; and 1,090,852 of Mueller-Tamm filed May 29, 1958.

In spite of these prior art attempts, it is only with difficulty that products are obtained containing the flame retardant in a homogeneous distribution.

In order to attain a more uniform distribution of the bromine or the bromine compounds, attempts have been made to introduce the bromine into the polystyrene in the form of an aqueous suspension as disclosed in German Pat. 1,093,089 of Aust et al., filed June 26, 1959, and British Pat. 1,093,089 of Aust et al., filed June 26, 1959, and British Pat. 988,289 which corresponds to U.S. patent application 119,996, filed June 27, 1961.

These conventional processes operate either at low temperatures with bromine or at elevated temperatures with bromine or at elevated temperatures with bromine compounds which are normally liquid, since solid bromine compounds cannot be homogeneously distributed in the suspension.

It is also known to employ ethers of dibromopropanol as the flame retardant for polystyrene as disclosed in U.S. Pat. 3,009,888 of Mueller-Tamm et al. which issued Nov. 21, 1961. However, these compounds exhibit the disadvantage that the foamed polystyrene molded articles treated therewith have high shrinkage values and do not show a sufficiently low density.

It is furthermore conventional to employ aromatic-aliphatic ethers brominated in the aromatic portion as agents imparting flame retardance as disclosed in U.S. Pat. 3,250,739 of Sauer et al. which issued May 10, 1966.

Also, it has been known to employ, as flame retardants for polyolefins, aromatic-aliphatic ethers of dibromopropanol which are brominated in the aliphatic as well as in the aromatic portions as disclosed in French Pat. 1,541,271 of Chemische Werke Hüls.

However, according to the prior art, tribomophenyl-dibromopropyl ether could not be used as a flame-retardant for styrene polymers even though it has a satisfactory stabilizing effect and can be compared to the bromine compounds solid under normal conditions and also, simultaneously, combines the advantageous properties of particular mobility and easier homogeneous dispersability.

Tribromophenyl-dibromopropyl ether could not be used as a flame retardant for the styrene polymers of the prior art, because tribromophenyl-dibromopropyl ether had to be used in such high amounts that molded articles are brittle or—generally speaking—had very poor mechanical properties.

SUMMARY OF THE INVENTION

Having in mind the limitations of the prior art, it is an object of the present invention to provide flame resistant expandable styrene polymers having a fire retardant consisting of tribromophenyldibromopropyl ether.

Another object of the present invention is to add tribromophenyldibromopropyl ether and blowing agents to granual or bead-like polystrene in an aqueous suspension.

Still another object of the present invention is to partially polymerize polystyrene monomers and comonomers in a suspension polymerization and prior to the completion of the polymerization add blowing agents and tribromophenyl-dibromopropyl ether and complete the polymerization.

It has now been surprisingly discovered that the limitations of the prior art are avoided if styrene polymers of a small particle size and containing a blowing agent, i.e. granular or bead-like expandable styrene polymers, are treated in an aqueous suspension, at temperatures of between 80 and 150° C., with liquid tribromophenyldibromopropyl ether.

DESCRIPTION OF THE PREFERRED EMBODIMENTS

The small particulate expandable styrene polymers are the commercial, granular or bead-like homopolymers and copolymers of styrene.

Suitable comonomers are: α-methylstyrene, nuclear-halogenated styrene, such as 2,4-dichlorostyrene, acrylonitrile, methacrylonitrile, esters of α,β-unsaturated carboxylic acids with alcohols of 1–8 carbon atoms, such as acrylates and methacrylates, and vinylcarbazole.

The copolymers contain at least 50 percent by weight of styrene with at most 50 percent by weight of the comonomers.

As the blowing agent, the foamable styrene polymers contain the conventional gaseous and liquid organic compounds which do not dissolve the styrene polymer, or merely swell same, and the boiling points of which are below the softening point of the polymers. These blowing agents include volatile non-solvents for polystyrene having a boiling point between 20 and 60°.

Such compounds are, for example, aliphatic hydrocarbons, such as propane, butane, pentane, hexane; cycloaliphatic hydrocarbons, such as cyclohexane; furthermore halogenated hydrocarbons, such as dichlorodifluoromethane, or 1,2,2-trifluoro-1,1,2-trichloroethane.

Mixtures of these blowing agent compounds can likewise be used. Optionally, solvents, such as methanol or ethanol can also be employed in a mixture with hydrocarbons or/and halogenated hydrocarbons, as blowing agents.

It is also possible to concomitantly employ so-called solid blowing agents as pore control agents, for example a mixture of sodium bicarbonate with organic acids, such as citric acid or boric acid.

The blowing agents are used in amounts of 3–15 percent by weight, preferably 5–7 percent by weight, based on the polymer.

It is particularly advantageous to use the aqueous suspension obtained during the polymerization of styrene or the styrene-comonomer mixture in the present of the blowing agents. This avoids a separate step for suspending the granular or bead-like expandable styrene polymers in water.

In a special embodiment of the present process, the polymers present in the suspension still contain 0.01–10 percent by weight, especially 0.01–1 percent by weight, of monomers. Furthermore, the polystyrene beads containing the blowing agent present in the aqueous suspension can contain less than the necessary amount of expanding agent, for example 2–6 percent by weight, preferably 4–6 percent by weight, instead of the before disclosed amount.

Into the hot, aqueous suspension, which has optionally been cooled, the tribromophenyl-dibromopropyl ether is introduced via a charging valve, at temperatures of between 80 and 150° C., particularly between 90 and 120° C.

This introduction takes place in the polymerization kettle. The tribromophenyl-dibromopropyl ether is added in the liquid phase—either in the form of a melt or as a solution or dispersion in a solvent heated to about 50° C. Suitable heated solvents for tribromophenyl-dibromopropyl ether are hexane, pentane, heptane and methylene chloride and particularly suitable solvents or dispersants are those which simultaneously serve as the blowing agents.

In the case where the tribromophenyl-dibromopropyl ether is added in the polymerization kettle, a correspondingly smaller amount of expanding agent is, of course, employed. The tribromophenyl-dibromopropyl ether melts at 40–42° C. and because of this melting point exhibits the advantage that it is useful in the liquid phase and thus ensures a homogeneous distribution in the polymer. However, this ether, at the same time, lacks the disadvantage of the customary liquid, flame-retarding agents, of being too readily volatile and thus being unable to impart to sufficient permanent flame retardance to the styrene polymer.

Thus, in the present case, the advantageous dispersability of the customary liquid flame retardants is combined with the high permanent stabilizing effect of the customary solid flame retardants.

Styrene polymers free of blowing agents, which contain the tribromophenyldibromopropyl ether in comparable quantities, do not exhibit flame-retardant properties.

The tribromophenyl-dibromopropyl ether is employed in such quantities that the bromine content of the styrene polymer containing the expanding agent is 2–4 percent by weight, preferably 2–3 percent by weight, of bromine, based on the styrene polymer.

It is also possible to employ the tribromophenyl-dibromopropyl ether together with conventional synergistic agents, for example organic peroxides, such as di-tert.-butyl peroxide, dicumyl peroxide, tert.-butyl peracetate, cumene hydroperoxide, cumyl isopropyl peroxide, etc., as disclosed in U.S. Pat. 3,324,076.

These peroxides are employed in amounts of 0.1–1.0 percent by weight, preferably 0.3–0.5 percent by weight, based on the styrene polymer.

When using such synergistic agents, the bromine content in the expandable styrene polymer is suitably 0.5–2.0 percent by weight, and preferably 0.7–1.0 percent by weight, of bromine, based on the styrene polymer.

The warm polystyrene suspension, into which the tribromophenyl-dibromopropyl ether is introduced, is thereafter maintained at the desired temperature for about 2–4 hours, it being possible to insert a reheating step, if desired.

In the case where monomer-containing polymers are involved and/or also those having a content of blowing agent which is not yet sufficient, the styrene or the styrene-comonomer mixture is polymerized completely in this stage of the process, and/or the expanding agent is incorporated by polymerization.

Examples of the overall composition styrene, blowing agent and tribromophenyl-dibromopropyl ether includes in parts by weight:

11,650 styrene, 1,165 n-pentane and 400 tribromophenyl-dibromopropyl ether; 11,650 styrene, 825 n-pentane plus 340 hexane and 400 tribromophenyl-dibromopropyl ether; 11,650 styrene, 900 methylene chloride, 300 hexane, 400 tribromophenyl-dibromopropyl ether; 11,650 styrene, 1,250 methylene chloride, 400 tribromophenyl-dibromopropyl ether; 11,650 styrene, 825 n-pentane, 340 isopentane, 400 tribromophenyl-dibromopropyl ether.

Examples of the overall composition styrene, blowing agent, synergist and tribromophenyl-dibromopropyl ether include in parts by weight:

11,650 styrene, 1,165 n-pentane, 60 di-tert.-butyl peroxide and 160 tribromophenyl-dibromopropyl ether; 11,650 styrene, 1,165 n-pentane, 60 dicumyl peroxide, 160 tribromophenyl-dibromopropyl ether; 11,650 styrene, 1,165 pentane, 40 dicumyl peroxide, 200 tribromophenyl-dibromopropyl ether; 11,650 styrene, 1,250 methylene chloride, 60 cumyl-isopropyl peroxide, 200 tribromophenyl-dibromopropyl ether; 11,650 styrene, 1,165 pentane, 30 dicumyl peroxide, 30 di-tert.-butyl peroxide, 160 tribromophenyl-dibromopropyl ether.

Examples of the overall composition styrene monomer, comonomer, blowing agent and tribromophenyl-dibromopropyl ether include in parts by weight: 10,000 styrene, 1,650 α-methyl styrene, 1,165 pentane, 400 tribromophenyl-dibromopropyl ether; 8,350 styrene, 3,300 α-methyl styrene, 1,300 methylene chloride, 400 tribromophenyl-dibromopropyl ether; 10,000 styrene, 1,650 acrylonitrile, 1,165 pentane, 400 tribromophenyl-dibromopropyl ether.

Without further elaboration, it is believed that one skilled in the art can, using the preceding description, utilize the present invention to its fullest extent.

The testing of the flameproof, expandable styrene polymers produced in the following examples is conducted in accordance with ASTM D 16 92–56 T.

The parts mentioned herein are parts by weight.

The K-value has the meaning as disclosed in H. Fikentscher, Cellulosechemie 13 (1932), p. 58.

Testing in accordance with ASTM D 1692–56 T

A test body (length 152.4 mm., thickness 13 mm.) is placed horizontally on a net. The flame is provided by a Bunsen burner (flat nozzle, about 48 mm.) with a flame height of about 38 mm., so that the flame reaches the edge of the test body, the burner being at a distance of 13 mm. from the test body. If the specimen does not continue burning at all, the classification is "non-burning by this test." If the material burns, but without exceeding the 127 mm., such a material is designated as "self-extinguishing by this test." If the material keeps on burning, it is called "burning by this test."

EXAMPLE 1

11,650 parts of styrene is polymerized in the presence of 28 parts of dibenzoyl peroxide and 7 parts of dicumyl peroxide, 20 parts of polyvinyl alcohol, and 17,045 parts of water and furthermore, 1,165 parts of n-pentane is present at a temperature of 90 to 140° C. for 16 hours. The monomer proportion of the expander-containing polymer particles present in the suspension is 0.2 percent. The suspension is cooled to 90° C., and 400 parts of molten tribromophenyl-dibromopropyl ether (50° C.) is introduced into the kettle. After another four hours at 90° C., the reaction is terminated; the expandable flameproof styrene polymer is processed in accordance with the usual methods.

Bromine content: 2.4 percent; K value: 60.

Molded, expanded articles produced therefrom are non-burning according to ASTM D 16 92–56 T. The molding operation is carried out as disclosed in H. L. von Cube and K. E. Pohl, Die Technologie des schäumbaren Polystyrols (1965), p. 28 ff—Vorschäumen im Dampf—and p. 47 ff—Fertigschäumen in strömendem Dampf.

When the procedure is conducted in the same manner, but in the absence of the blowing agent n-pentane, the molded articles treated with tribromophenyl-dibromopropyl ether burn up and are burning by the ASTM test.

EXAMPLE 2

In accordance with the method described in Example 1, there are added, in place of 400 parts by weight, only 160 parts of molten tribromophenyl-dibromopropyl ether, and 60 parts of di-tert.-butyl peroxide.

Bromine content: 0.9 percent; K value: 57.

Molded expanded articles produced from a sample obtained in this manner are non-burning according to ASTM D 16 92–56 T.

EXAMPLE 3

In accordance with the method described in Example 1, 400 parts of tribromophenyl-dibromopropyl ether are added, emulsified in 340 parts of hexane at a temperature of 50° C. Furthermore, the amount of pentane is added which is reduced by the parts of hexane.

Bromine content: 2.5 percent; K value: 59.

Molded, expanded articles made from this sample are non-burning according to ASTM D 16 92–56 T.

EXAMPLE 4

Comparative example (U.S. Patent 3,009,888)

A solution of 20 parts of polystyrene, 80 parts of styrene, 6 parts of petroleum ether (pentane fraction), 4 parts of 2,3-dibromopropoxyethyl 2′,3′-dibromopropyl ether, 2 parts of lauroyl peroxide are charged into a container which is then well closed and kept for 8 weeks at 24° to 30° C. Within this time the contents harden to a solid block. The polymer formed is ground and can then be worked up.

By heating to 95° to 100° C., for example in boiling water, the polymer thus obtained expands to three to four times its original volume and may be worked up by suitable moulds into plates, blocks or shaped articles of any kind.

The flame resistant porous articles produced have densities of down to 0.02 to 0.04 gram per cc. The flame resistant porous articles of Examples 1, 2 and 3 differ from the articles of Example 4 in that they have lower densities of 0.012 to <0.02 gram per ccm. and that the shrinkage value is 10 to 20% smaller.

We claim:

1. Flame resistant expandable styrene polymers containing a volatile non-solvent for polystyrene having a boiling point between about 20–60° C. and containing tribromophenyl-dibromopropyl ether wherein the bromine in said ether is about 2 to 4 percent by weight of said styrene polymers.

2. The composition of claim 1, further comprising a synergistic agent consisting of an organic peroxide having a concentration of about 0.1 to 1.0 percent by weight based on the styrene polymers.

3. The composition of claim 2, wherein said bromine is 0.5 to 2.0 percent by weight.

4. A process for the production of flame resistant expandable styrene polymers which comprises:
 (a) incorporating in said styrene polymers a volatile non-solvent for polystyrene having a boiling point between 20 and 60° C.; and
 (b) incorporating in said styrene polymers tribromophenyl-dibromopropyl ether wherein the bromine in said ether is about 2–4 percent by weight of said styrene polymers.

5. The process of claim 4, wherein steps (a) and (b) are carried out in an aqueous suspension at temperatures between about 80–150° C. and said tribromophenyl-dibromopropyl ether is in a liquid phase.

6. The process of claim 5, wherein said styrene polymers contain about 0.01–1 percent by weight of monomeric components.

7. The process of claim 6, wherein said monomeric components are 0.01–1 percent.

8. The process of claim 5, wherein a portion of said volatile non-solvent is used.

9. The process of claim 5, wherein said tribomophenyl-dibromopropyl ether is employed in the form of the melt thereof.

10. The process of claim 5, wherein said tribromophenyl-dibromopropyl ether is employed in the form of a heated dispersion, the dispersant consisting of said volatile non-solvent.

11. The process of claim 6, wherein a polymerization of the monomer-containing styrene polymer is completed in the presence of said tribromophenyl-dibromopropyl ether.

12. The process of claim 5, wherein the bromine in said ether is about 2–3 percent by weight of said styrene polymers.

13. The process of claim 5, further comprising an organic peroxide as a synergist having a concentration of about 0.1–1.0 percent by weight based on the styrene polymer.

14. The process of claim 13, wherein said synergist is about 0.3–0.5 percent by weight.

15. The process of claim 13, wherein the bromine in said ether is about 0.5–2.0 percent by weight of said styrene polymer.

16. The process of claim 13, wherein the bromine in said ether is about 0.7–1.0 percent by weight of said styrene polymer.

References Cited

UNITED STATES PATENTS 3,271,333   9/1966   Eichhorn _____ 260—2.5 FP

OTHER REFERENCES

Felton et al.: J. Org. Chemistry 12 (1947), p. 298.

MURRAY TILLMAN, Primary Examiner

M. FOELAK, Assistant Examiner

U.S. Cl. X.R.

260—47 R, 93.5 W, 612 D